Figure 1:
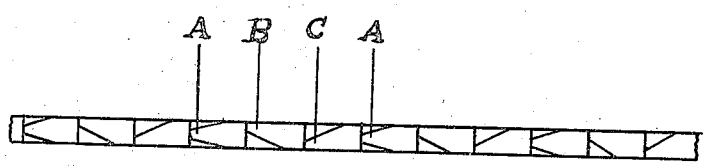

T. T. CARLSON.
SAW TOOTH.
APPLICATION FILED MAR. 9, 1917.

1,240,939.

Patented Sept. 25, 1917.

INVENTOR

Theodore T. Carlson.

UNITED STATES PATENT OFFICE.

THEODORE T. CARLSON, OF FITCHBURG, MASSACHUSETTS, ASSIGNOR TO SIMONDS MANUFACTURING COMPANY, OF FITCHBURG, MASSACHUSETTS, A CORPORATION OF MASSACHUSETTS.

SAW-TOOTH.

1,240,939.  Specification of Letters Patent.  Patented Sept. 25, 1917.

Application filed March 9, 1917. Serial No. 153,613.

*To all whom it may concern:*

Be it known that I, THEODORE T. CARLSON, a citizen of the United States of America, residing at Fitchburg, in the county of Worcester and Commonwealth of Massachusetts, have invented an Improvement in Saw-Teeth, of which the following is a specification.

The invention relates to the form, construction and arrangement of the teeth of saws and is particularly applicable to saws used for cutting metal, although the improvement will be found of great advantage in saws of all kinds.

Heretofore, saws have been made with each alternate tooth narrower than the width of the kerf, while the others are of the full width; the narrow teeth making a narrow central cut while the teeth of full width, cut on both sides of the narrow channel. This puts a great strain upon the wide teeth, and also large chips are produced which are liable to catch upon the teeth and be wedged between them and the sides of the kerf by reason of which the teeth are often broken; also when these chips are carried around with the teeth the friction upon the sides of the kerf produces great heat and often causes the chips to stick, or be "welded" upon the teeth, as it is called.

In some instances also, the teeth of saws have been arranged with a narrow tooth to cut a central groove, and then with a tooth which cuts the material on one side of the central groove then a narrow tooth to cut the central groove again and then a tooth which cuts on the other side of the central groove, thus completing the full width of the kerf.

In this arrangement, the narrow teeth, which have the easiest work to do, alternate with the other teeth which cut first on one side of the central groove and then on the other. This side cutting, is more difficult than the center cutting and puts a greater strain upon these side cutting teeth than is put upon the center cutting teeth. It is obvious that this produces unequal wear of the teeth. In this arrangement also, each of these side cutting teeth is in operation only one quarter of the time and thus have twice the amount of material to remove from the kerf that the center cutting teeth have, in the same period of time, and this of necessity produces larger and uneven sizes of chips and greater liability of clogging and accident.

In the improved construction herein shown and described, the teeth of the saw are arranged in groups of three, namely, a narrow tooth for the center cut, then a tooth for a cut on one side of the center and then a tooth for a cut on the other side of the center, thus giving practically the same amount of work for each tooth in the same period of time, breaking up the material removed, into small chips, equalizing the strain and obviating the liability of breaking the teeth, and the difficulty of "welding" chips upon the teeth. I find it advantageous to have the base of each tooth the same thickness as the saw blade.

Figure 2:
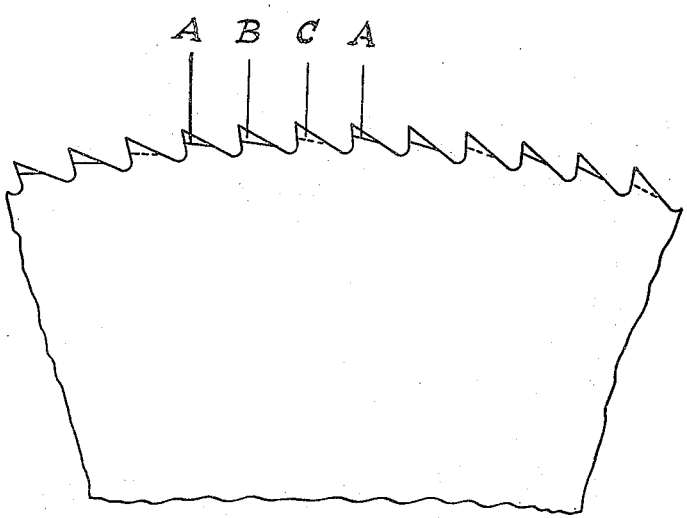

In the drawings accompanying this specification, Figure 1, shows the arrangement of the teeth in plan view; Fig. 2, shows a side elevation of a circular saw, with the same arrangement of teeth.

Referring to the drawings, D represents the saw blade, A, designates the narrow tooth beveled upon both sides at the cutting end for producing the central groove; B, the tooth beveled off on the left side at the cutting end, to cut the material remaining on the right hand side of the central groove and C, the tooth beveled off on the right side at the cutting end to remove the material remaining on the left hand side of the central groove, and the next in succession is another narrow tooth A, and then follow the teeth with the left and right hand bevel as before.

By practical test of this arrangement of teeth in saws, it has been found that it has great advantages over previous arrangements, as heretofore stated, in equalizing the strain upon the teeth, preventing the breaking of the teeth and the difficulty of chips sticking or "welding" to the teeth.

This construction and arrangement of teeth is particularly advantageous and beneficial in saws for metal cutting, especially the softer metals; but it will be found equally advantageous for wood cutting saws.

I claim:

1. A saw blade provided with teeth of equal length comprising a plurality of groups, each of three teeth, the first tooth of each series having at its extremity a straight cutting edge of a width substantially one-third the width of the completed kerf to form a center cut, a second tooth having a straight cutting edge for cutting on one side of the center cut and the third tooth having a straight cutting edge for cutting on the opposite side of the center cut for completing the full width of the kerf, the width of such straight cutting edge of the said second and third teeth each substantially equaling that of the straight cutting edge on the first tooth and all the cutting edges of the teeth arranged within the planes of the opposite faces of the saw blade.

2. A saw blade provided with teeth of equal length comprising a plurality of groups, each group consisting of three teeth, and each tooth having a base equal in width to the saw blade, the first tooth of each group beveled upon each side at the cutting end and provided with a straight cutting edge of a width substantially equal to one third of the width of the complete kerf to be cut, to form a center cut, the second and third teeth beveled alternately upon the right and left inner sides at the cutting end and having a straight cutting edge of a length only substantially the width of the cutting edge on the first-mentioned tooth, said second and third teeth adapted to cut the material remaining on each side of said central cut to the full width of the kerf.

THEODORE T. CARLSON.

Copies of this patent may be obtained for five cents each, by addressing the "Commissioner of Patents, Washington, D. C."